(12) United States Patent
Gowrisankar (10) Patent No.: US 11,719,316 B2
(45) Date of Patent: Aug. 8, 2023

(54) ELECTRIC DRIVE AXLE

(71) Applicant: Dana Belgium N.V., Bruges (BE)

(72) Inventor: Devaraj Gowrisankar, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/810,216

(22) Filed: Jun. 30, 2022

(65) Prior Publication Data
US 2023/0003289 A1    Jan. 5, 2023

(30) Foreign Application Priority Data
Jul. 5, 2021   (DE) .................... 10 2021 207 050.7

(51) Int. Cl.
| | | |
|---|---|---|
| *B60K 1/00* | (2006.01) | |
| *B60K 17/12* | (2006.01) | |
| *F16H 37/08* | (2006.01) | |
| *F16H 57/04* | (2010.01) | |
| *F16H 57/037* | (2012.01) | |
| *B60K 17/16* | (2006.01) | |
| *B60K 17/04* | (2006.01) | |
| *F16H 57/02* | (2012.01) | |

(52) U.S. Cl.
CPC ............. *F16H 37/082* (2013.01); *B60K 1/00* (2013.01); *B60K 17/04* (2013.01); *B60K 17/165* (2013.01); *F16H 57/037* (2013.01); *F16H 57/0476* (2013.01); *B60K 2001/001* (2013.01); *F16H 2057/02043* (2013.01); *F16H 2057/02052* (2013.01)

(58) Field of Classification Search
CPC .. F16H 37/082; F16H 57/037; F16H 57/0476; F16H 2057/02043; F16H 2057/02052; B60K 1/00; B60K 17/04; B60K 17/165; B60K 2001/001; B60K 17/12
See application file for complete search history.

(56) References Cited

U.S. PATENT DOCUMENTS

| | | | | |
|---|---|---|---|---|
| 5,577,973 | A * | 11/1996 | Schmidt ............... | B60W 10/115 903/910 |
| 7,549,940 | B2 * | 6/2009 | Kira ....................... | B60K 6/365 475/204 |
| 8,049,384 | B2 * | 11/2011 | Wilton ..................... | B60K 1/00 310/83 |
| 8,169,110 | B2 | 5/2012 | Swales et al. | |
| 9,500,267 | B2 * | 11/2016 | Hederstad ................. | B60K 6/48 |
| 9,707,834 | B2 | 7/2017 | Lee et al. | |
| 10,632,987 | B2 * | 4/2020 | Tanaka ................... | B60W 20/14 |
| 10,794,485 | B2 * | 10/2020 | Tanaka ................ | F16H 63/3483 |
| 11,002,350 | B2 * | 5/2021 | Waltz ..................... | B60K 17/08 |

(Continued)

FOREIGN PATENT DOCUMENTS

| | | | |
|---|---|---|---|
| CN | 105443707 | A * | 3/2016 |
| CN | 110406362 | A * | 11/2019 |

(Continued)

*Primary Examiner* — Sherry L Estremsky
(74) *Attorney, Agent, or Firm* — McCoy Russell LLP (57) ABSTRACT

The present document relates to an electric drive axle comprising an electric motor, a first planetary gear set, a second planetary gear set, and a differential assembly. The electric motor is drivingly connected or drivingly connectable to the differential assembly via the first planetary gear set and via the second planetary gear set.

20 Claims, 3 Drawing Sheets

(56) References Cited

U.S. PATENT DOCUMENTS 11,015,683 B2 * 5/2021 Suyama .................... F16H 1/46
2020/0278013 A1 * 9/2020 Engerman ................ B60K 1/00

FOREIGN PATENT DOCUMENTS

| CN | 112440737 | A | * | 3/2021 | |
|----|-----------|---|---|--------|---|
| DE | 102015214339 | A1 | * | 2/2017 | |
| DE | 102019207786 | A1 | * | 12/2020 | ............... B60K 1/00 |
| DE | 102019207787 | A1 | * | 12/2020 | ......... F16H 57/0417 |

* cited by examiner

ELECTRIC DRIVE AXLE

CROSS-REFERENCE TO RELATED APPLICATION

The present application claims priority to German Patent Application No. 10 2021 207 050.7, entitled "ELECTRIC DRIVE AXLE", and filed on Jul. 5, 2021. The entire contents of the above-listed application is hereby incorporated by reference for all purposes.

TECHNICAL FIELD

The present document primarily relates to an electric drive axle, such as for a vehicle.

BACKGROUND AND SUMMARY

Known electric drive axles with gear reductions often exhibit deficiencies with regard to axle packaging and torque transfer capacity. Space inefficient axle assemblies may therefore not be integrated into space constrained vehicles, thereby limiting the applicability of the axles.

U.S. Pat. No. 9,707,834B2 relates to a transmission with a common carrier planetary gear set for a vehicle that has drive axle half shafts defining an axis of rotation, an electric motor/generator with a motor shaft parallel with the axis of rotation, either concentric with the axis of rotation or spaced therefrom, and a differential with a differential carrier connected with the drive axle half shafts. The planetary gear set has a first sun gear member integrally manufactured or selectively connectable with the motor shaft, first and second planet gears, a carrier member rotatably supporting the first and the second planet gears so that the first planet gear meshes with the first sun gear member, and a ring gear member meshing with the planet gears. The ring gear is connectable to a non-rotating housing. The carrier member is operatively connected with the differential carrier.

U.S. Pat. No. 8,169,110B2 relates to an oil-cooled motor/generator for an automotive powertrain located outside of the transmission, such as a BAS motor/generator. The motor/generator may have a stator, a rotor circumscribed by the stator, and a motor shaft on which the rotor is mounted for rotation. A housing assembly may surround the stator and the rotor, with a bearing positioned between the housing assembly and the motor shaft. A flow control member may at least partially circumscribe the rotor axially adjacent the stator. A bearing retainer may be positioned axially adjacent the bearing. A rotor end ring may be axially adjacent the rotor. The housing assembly may have an inlet configured to receive cooling oil by spraying or injector. The housing assembly, the flow control member, the bearing retainer and the rotor end ring may be configured to distribute the cooling oil from the inlet to cool the stator, the rotor and lubricate the bearing.

Thus, there is demand for a compact electric drive axle with high torque transfer capacity.

An electric drive axle which realizes these advantages is described herein.

The presently proposed electric drive axle comprises an electric motor, a first planetary gear set, a second planetary gear set, and a differential assembly. The electric motor is drivingly connected or drivingly connectable to the differential assembly via the first planetary gear set and via the second planetary gear set. As the electric motor is drivingly connected or drivingly connectable to the differential assembly via the first planetary gear set and via the second planetary gear set, the electric drive axle may transfer a high torque and feature a high degree of compactness.

The electric motor usually comprises a rotor rotatable with respect to a rotation axis. The first planetary gear set, the second planetary gear set and the differential assembly may be coaxial with the rotation axis. The electric motor usually further comprises a stator. The stator of the electric motor may enclose or at least partially enclose the rotor of the electric motor.

The electric drive axle may comprise a housing. The stator of the electric motor may be stationary relative to the housing. At least one, several or all of the electric motor, the first planetary gear set, the second planetary gear set and the differential assembly may be disposed within the housing. The housing may include a fluid sump holding or configured to hold a lubricant. One or more of the electric motor, the first planetary gear set, the second planetary gear set and the differential assembly may be disposed within the fluid sump. A lubricant held within the fluid sump may then cool the electric motor. Additionally or alternatively, a lubricant held within the fluid sump may lubricate at least one, several or all of the electric motor, the first planetary gear set, the second planetary gear set and the differential assembly.

The first planetary gear set and the second planetary gear set may share a common ring gear. The common ring gear may be stationary relative to the housing or to the stator of the electric motor. For example, the common ring gear may be fixed to the housing or may be integral with the housing.

The first planetary gear set may be drivingly connected or drivingly connectable to the differential assembly via the second planetary gear set. The first planetary gear set typically comprises a first sun gear, a first planetary carrier and one or more first planet gears rotatably disposed on the first planetary carrier. The second planetary gear set typically comprises a second sun gear, a second planetary carrier and one or more second planet gears rotatably disposed on the second planetary carrier. The first planetary carrier may be rigidly or torsionally connected to the second sun gear.

The rotor of the electric motor may be rigidly connected to or integral with the first sun gear. For example, the rotor of the electric motor and the first sun gear may be connected to one another in a torque-proof manner via a splined connection. One of the first sun gear and the first planetary carrier may be rigidly connected to one of the second sun gear and the second planetary carrier. For example, the first planetary carrier may be rigidly connected to or integral with the second sun gear. The differential assembly typically comprises a differential carrier. The second planetary carrier may then be rigidly connected to or integral with the differential carrier.

The electric drive axle may include a bearing, for example a first bearing, rotatably supporting the first planetary carrier on a rotor of the electric motor. For instance, at least a portion of the first planetary carrier may radially enclose at least a portion of the rotor of the electric motor. The first bearing may then include an outer ring mounted on a radially inner side of the first planetary carrier, wherein the radially inner side of the first planetary carrier faces the rotation axis, an inner ring mounted on a radially outer side of the rotor of the electric motor, wherein the radially outer side of the rotor of the electric motor faces away from the rotation axis, and a plurality of rolling members such as a plurality of spheres radially disposed between and/or received within the inner and the outer ring of the first bearing. A snap ring or circlip mounted on the radially inner side of the first planetary carrier may locate or fix the outer ring of the first bearing along the axial direction. For example, the snap ring or circlip mounted on the radially inner side of the first planetary carrier may restrict axial movement of the outer ring of the first bearing away from the stator of the electric motor or toward the differential assembly. Similarly, a collar mounted on the radially outer side of the rotor of the electric motor may locate or fix the inner ring of the first bearing along the axial direction. For example, the collar mounted on the radially outer side of the rotor of the electric motor may restrict axial movement of the inner ring of the first bearing towards the stator of the electric motor or away from the differential assembly.

The electric drive axle may include a bearing, for example a second bearing, rotatably supporting the first planetary carrier on the housing. For instance, at least a portion of the housing may radially enclose at least a portion of the first planetary carrier. The second bearing may then include an outer ring mounted on a radially inner side of the housing, wherein the radially inner side of the housing faces the rotation axis, an inner ring mounted on a radially outer side of the first planetary carrier, wherein the radially outer side of the first planetary carrier faces away from the rotation axis, and a plurality of rolling members such as a plurality of spheres radially disposed between and/or received within the inner and the outer ring of the second bearing. A collar mounted on or integral with the radially inner side of the housing may locate or fix the outer ring of the second bearing along the axial direction. For example, the collar mounted on or integral with the radially inner side of the housing may restrict axial movement of the outer ring of the second bearing toward the stator of the electric motor or away from the differential assembly. Similarly, a collar mounted on or integral with the radially outer side of the first planetary carrier may locate or fix the inner ring of the second bearing along the axial direction. For example, the collar mounted on or integral with the radially outer side of the first planetary carrier may restrict axial movement of the inner ring of the second bearing away from the stator of the electric motor or toward the differential assembly.

The electric drive axle may include a bearing, for example a third bearing, rotatably supporting the second planetary carrier on the first planetary carrier. For instance, at least a portion of the second planetary carrier may radially enclose at least a portion of the first planetary carrier. The third bearing may then include an outer ring mounted on a radially inner side of the second planetary carrier, wherein the radially inner side of the second planetary carrier faces the rotation axis, an inner ring mounted on a radially outer side of the first planetary carrier, wherein the radially outer side of the first planetary carrier faces away from the rotation axis, and a plurality of rolling members such as a plurality of spheres radially disposed between and/or received within the inner and the outer ring of the third bearing. A collar or shoulder mounted on or integral with the radially outer side of the first planetary carrier may locate or fix the inner ring of the third bearing along the axial direction. For example, the collar or shoulder mounted on or integral with the radially outer side of the first planetary carrier may restrict axial movement of the inner ring of the third bearing toward the stator of the electric motor or away from the differential assembly. Similarly, a collar or shoulder mounted on or integral with the radially inner side of the second planetary carrier may locate or fix the outer ring of the third bearing along the axial direction. For example, the collar or shoulder mounted on or integral with the radially inner side of the second planetary carrier may restrict axial movement of the outer ring of the third bearing away from the stator of the electric motor or toward the differential assembly.

The electric drive axle may include a bearing, for example a fourth bearing, rotatably supporting the differential carrier of the differential assembly or the second planetary carrier integral with the differential carrier on the housing. For instance, at least a portion of the housing may radially enclose at least a portion of the differential carrier or of the second planetary carrier. The fourth bearing may then include an outer ring mounted on a radially inner side of the housing, wherein the radially inner side of the housing faces the rotation axis, an inner ring mounted on a radially outer side of the second planetary carrier, wherein the radially outer side of the second planetary carrier faces away from the rotation axis, and a plurality of rolling members such as a plurality of spheres radially disposed between and/or received within the inner and the outer ring of the fourth bearing. A collar or shoulder mounted on or integral with the radially inner side of the housing may locate or fix the outer ring of the fourth bearing along the axial direction. For example, the collar or shoulder mounted on or integral with the radially inner side of the housing may restrict axial movement of the outer ring of the fourth bearing away from the stator of the electric motor and/or away from the differential assembly. Similarly, a collar or shoulder mounted on or integral with the radially outer side of the second planetary carrier or of the differential carrier may locate or fix the inner ring of the fourth bearing along the axial direction. For example, the collar or shoulder mounted on or integral with the radially outer side of the second planetary carrier or of the differential carrier may restrict axial movement of the inner ring of the fourth bearing toward the stator of the electric motor and/or toward the differential assembly.

The electric drive axle may further comprise a first drive half shaft coaxial with the rotation axis defined by the rotor of the electric motor. Usually, the electric drive axle further comprises a second drive half shaft coaxial with the first drive half shaft. One of the first drive half shaft and the second drive half shaft may reach through the electric motor, for example through the rotor of the electric motor. Further, one of the first and the second drive half shaft may reach through one or both of the first planetary gear set and the second planetary gear set, for example through the first sun gear and through the second sun gear.

BRIEF DESCRIPTION OF THE FIGURES

An embodiment of the presently proposed electric drive axle is described in the following detailed description with respect to the drawings.

DETAILED DESCRIPTION

Figure 1:
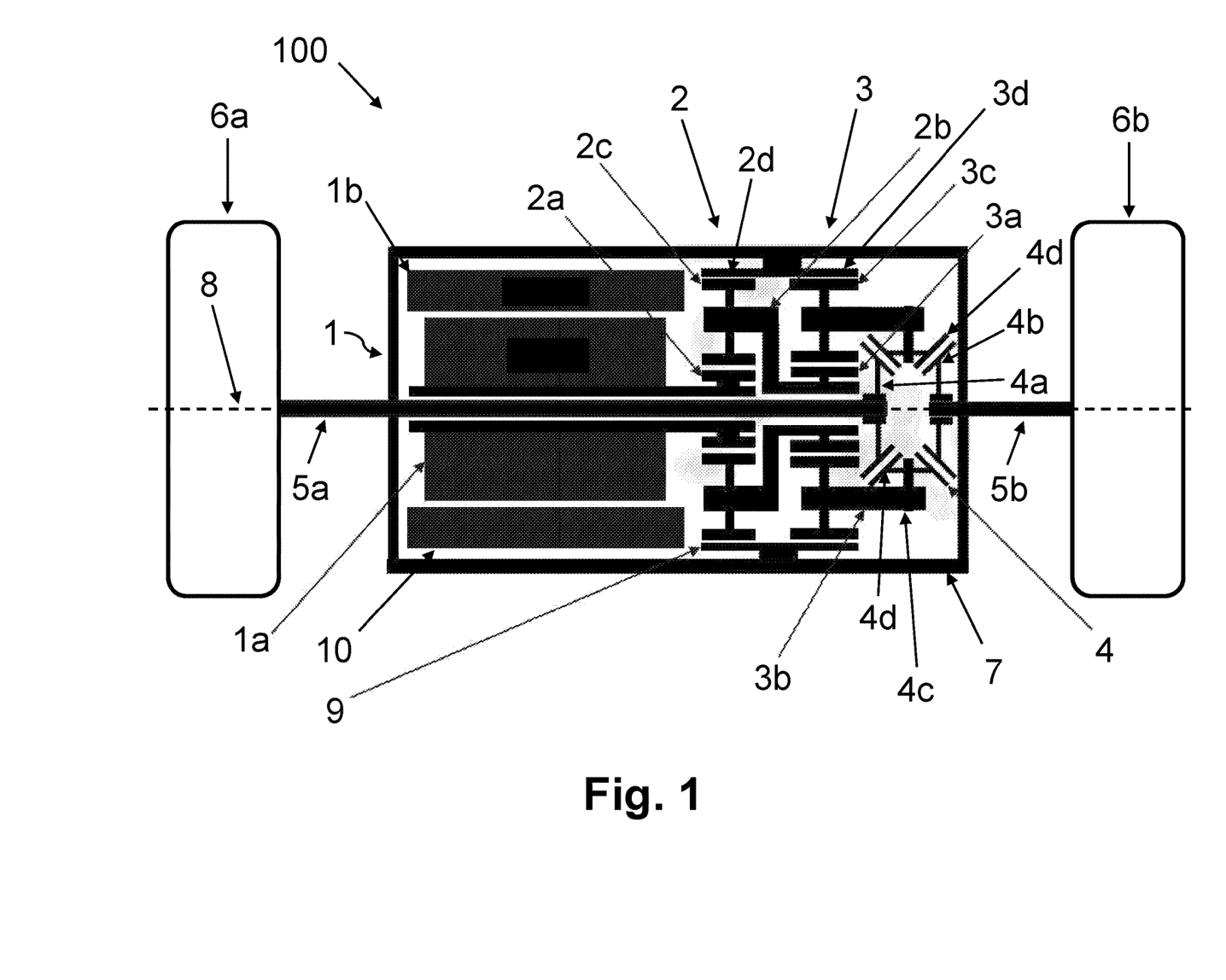
FIG. 1 schematically shows a sectional view of an embodiment of an electric drive axle of the presently proposed type.

FIG. 1 schematically illustrates a sectional view of an embodiment of an electric drive axle 100 of the presently proposed type. For example, the electric drive axle 100 may be included in an automotive vehicle such as a passenger car, a commercial vehicle such as a truck or bus, or in an off-highway vehicle such as a forklift truck, a tractor, a harvester, a dumper, a wheel loader, or the like. The electric drive axle includes an electric motor 1, a first planetary gear set 2, a second planetary gear set 3, a differential assembly 4, a first drive half shaft 5a, a first vehicle wheel 6a, a second drive half shaft 5b, a second vehicle wheel 6b, and a housing 7. The first vehicle wheel 5a is mounted on and/or drivingly connected to the first drive half shaft 5a, and the second vehicle wheel 5b is mounted on and/or drivingly connected to the second drive half shaft 5b. In the embodiment depicted here, the electric motor 1, the planetary gear sets 2, 3 and the differential assembly 4 are disposed within the housing 7. The drive half shafts 5a, 5b are at least partially disposed within the housing 7. The housing 7 includes a fluid sump 10 for holding a lubricant such as oil. When the fluid sump 10 is filled or at least partially filled with lubricant, the lubricant may cool the electric motor 1. Further, when the fluid sump 10 is filled or at least partially filled with a lubricant, the lubricant may lubricate one or more of the electric motor, the first planetary gear set 2, the second planetary gear set 3 and the differential assembly 4.

The electric motor 1 is drivingly connected to or drivingly engaged with the axle half shafts 5a, 5b via the planetary gear sets 2, 3 and the differential assembly 4. Specifically, the electric motor 1 is drivingly connected to or drivingly engaged with the second planetary gear set 3 via the first planetary gear set 2. And the first planetary gear set 2 is drivingly connected to or drivingly engaged with the differential assembly 4 via the second planetary gear set 3.

The differential assembly 4 may be an open differential. For example, the differential assembly 4 may comprise a differential carrier 4c and spider gears 4d rotationally mounted on the differential carrier 4c. The differential carrier 4c may then drive the drive half shafts 5a, 5b via the spider gears 4d and via side gears 4a, 4b rotationally connected to the drive half shafts 5a, 5b, respectively. For example, the side gears 4a, 4b may be fixed to the drive half shafts 5a, 5b, or the side gears 4a, 4b may be connected to the drive half shafts 5a, 5b in a torque-proof manner via a splined connection, respectively. In this way, the drive half shafts 5a, 5b may rotate relative to one another, or, equivalently, the drive half shafts 5a, 5b may rotate at different speeds relative to the housing 7 or relative to the stator 1b. For instance, the drive half shafts 5a, 5b may rotate or turn at different speeds when a vehicle including the electric drive axle 100 drives around a curve. However, it is understood that in some embodiments the differential assembly 4 may include a locking mechanism configured to selectively rotationally lock the drive half shafts 5a, 5b to one another. This may prevent one of the drive half shafts 5a, 5b from overspinning, such as when one of the drive half shafts 5a, 5b loses traction or lifts off the ground.

The electric motor 1 comprises a rotor 1a and a stator 1b. The rotor 1a defines and is rotatable with respect to a rotation axis 8, illustrated here as a dashed line. As illustrated in the figures, the rotation axis 8 may be coaxial with the planetary gear sets 2, 3, with the differential assembly 4 and with the drive half shafts 5a, 5b. In the embodiment of the electric drive axle 100 illustrated here, the stator 1b radially encloses the rotor 1a. The stator 1b is stationary relative to the housing 7. For example, the stator 1b may be fixed to the housing 7. It is understood that in alternative embodiments not depicted here the rotor 1a may radially enclose the stator 1b. Here, the first drive half shaft 5a reaches through the electric motor 1. More specifically, the first drive half shaft 5a reaches through the rotor 1a. The electric motor 1 may include any known type of electric motor. For example, the electric motor 1 may include but is not limited to a DC motor or an AC motor, such as a synchronous or an asynchronous electric motor.

The first planetary gear set 2 includes a first sun gear 2a, a first planetary carrier 2b with one or more first planet gears 2c rotatably mounted thereon, for example via a planet shaft, and a first ring gear 2d. The first planet gears 2c mesh with the first sun gear 2a and with the first ring gear 2d. The second planetary gear set 3 includes a second sun gear 3a, a second planetary carrier 3b with one or more planet gears 3c rotatably mounted thereon, for example via a planet shaft, and a second ring gear 3d. The second planet gears 3c mesh with the second sun gear 3a and with the second ring gear 3d.

In the embodiment depicted here, the ring gears 2d, 3d are configured as a one ring gear 9 common to both the first planetary gear set 2 and the second planetary gear set 3. That is, the ring gears 2d, 3d have the same inner radius, a common toothing and may be made in one piece. However, it is conceivable that in alternative embodiments the ring gears 2d, 3d may be configured as separate gears. For example, in alternative embodiments the ring gears 2d, 3d may have different inner radii and/or different toothings. Here, the common ring gear 9 is fixed to or integral with the housing 7. However, it is likewise conceivable that in alternative embodiments the ring gears 2d, 3d or the common ring gear 9 are free to rotate relative to the housing 7 and/or relative to one another, or that the ring gears 2d, 3d or the common ring gear 9 may be selectively drivingly engageable or selectively fixed to the housing 7, for example via one or more clutches or brakes.

Figure 2:
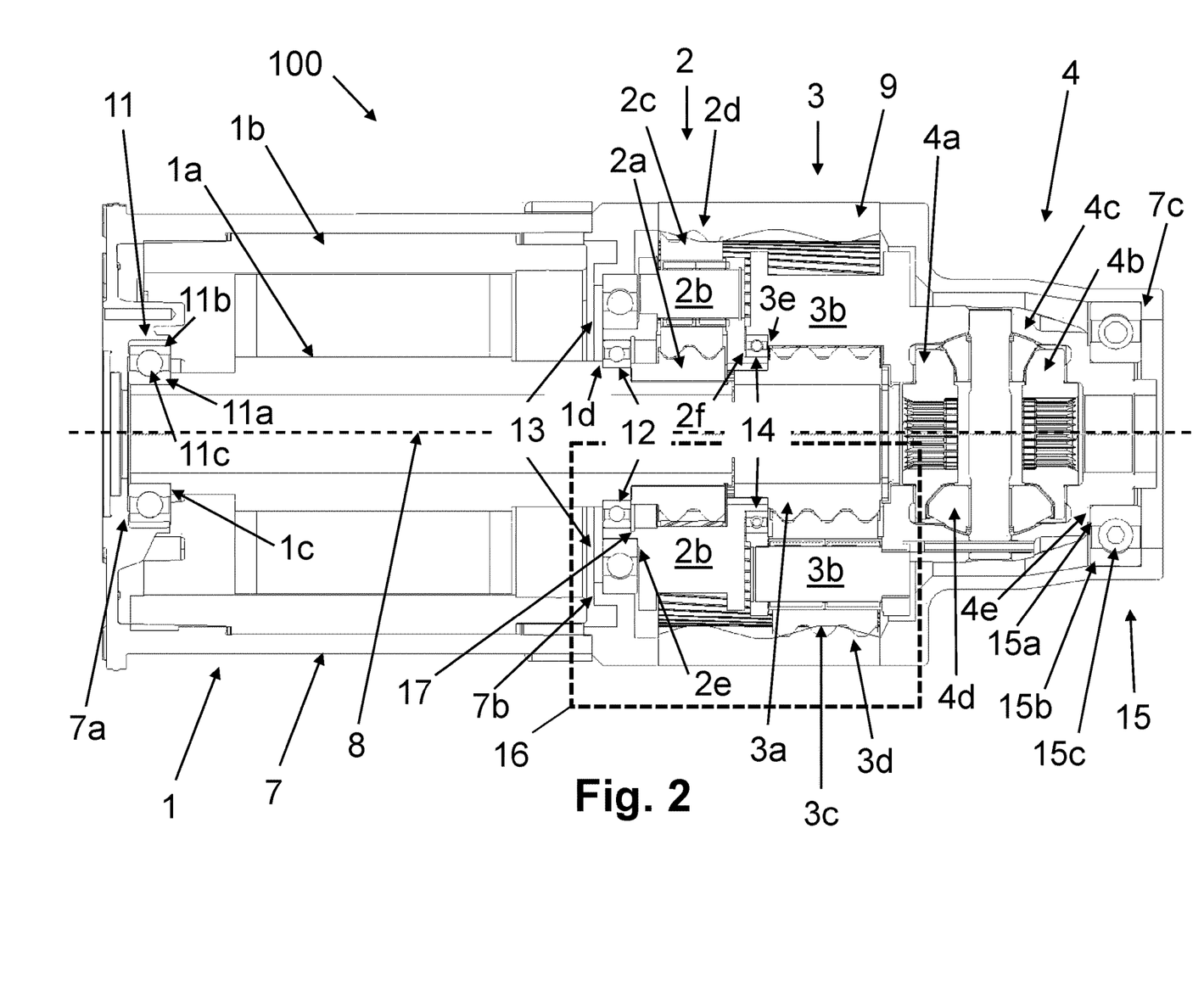
FIG. 2 schematically shows a sectional view of a layout of the electric drive axle of FIG. 1.
Figure 3:
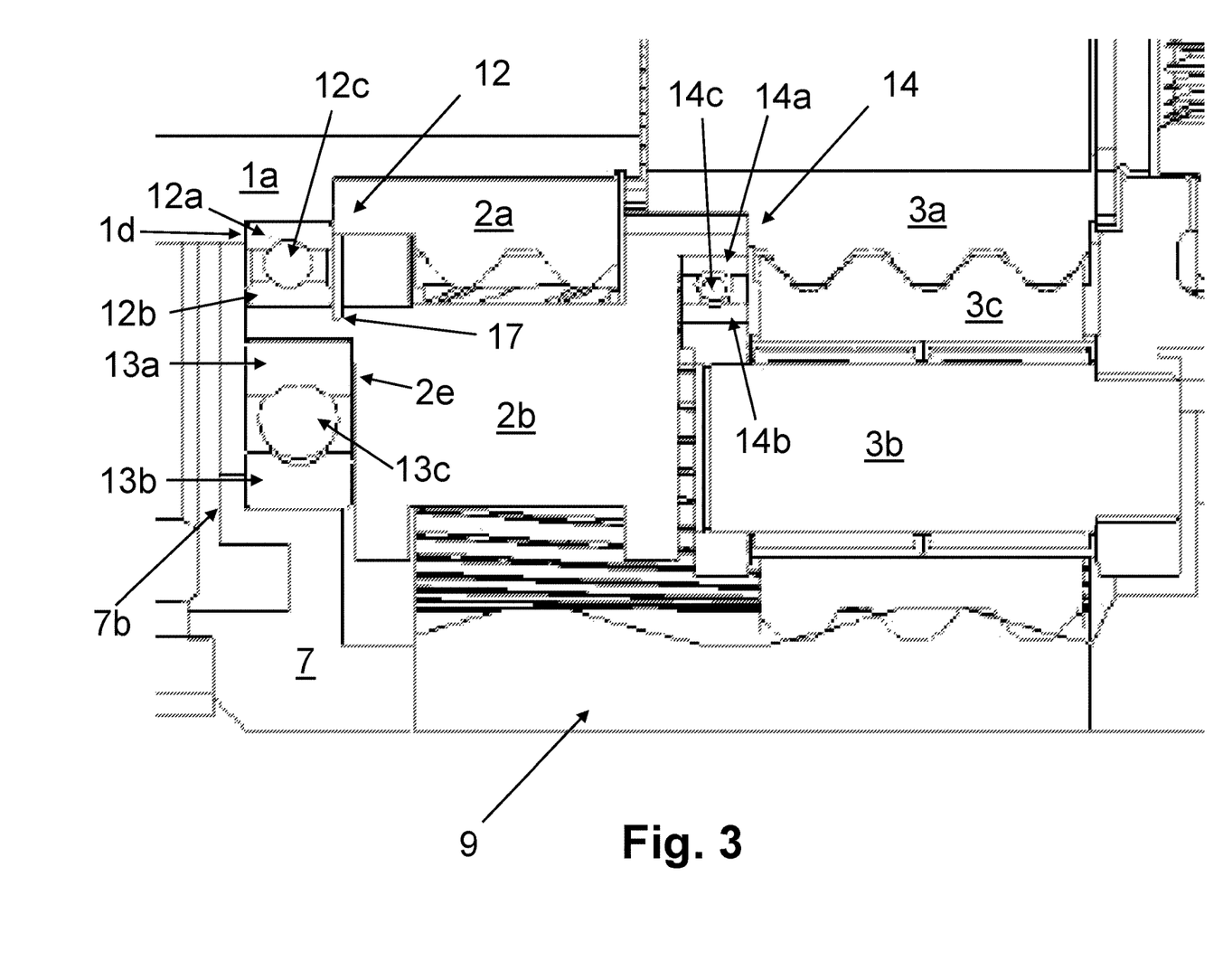
FIG. 3 shows an enlarged view of a detail of FIG. 2

In the embodiment depicted in the figures the rotor 1a of the electric motor 1 is rotationally connected to the first sun gear 2a. For example, the first sun gear 2a may be fixed to the rotor 1a, or the first sun gear 2a may be integral with the rotor 1a. Further, the first planetary carrier 2b is rotationally connected to the second sun gear 3a. For example, the second sun gear 3a may be fixed to the first planetary carrier 2b, or the second sun gear 3a may be integral with the first planetary carrier 2b. And the second planetary carrier 3b is rotationally connected to the differential carrier 4c of the differential assembly 4. For example, the second planetary carrier 3b may be fixed to the differential carrier 4c, or the second planetary carrier 3b may be integral with the differential carrier 4c.

FIG. 2 schematically shows a sectional view of a layout of the electric drive axle 100 of FIG. 1. For illustrative purposes only, the drive half shafts 5a, 5b and the vehicle wheels 6a, 6b mounted on the drive half shafts 5a, 5b are not shown in FIG. 2. FIG. 3 shows a detail of FIG. 2. In FIG. 2 the detail shown in FIG. 3 is highlighted by a dashed box indicated at 16. Here and in all of the following, features recurring in different figures are designated with the same reference signs. In addition to those features of FIG. 2 already illustrated in FIG. 1 and discussed above, FIG. 2 further shows bearings 11, 12, 13, 14, 15. Among other things, FIG. 3 illustrates details of the bearings 12, 13 and 14 depicted in FIG. 2.

The bearing 11 rotatably supports the rotor 1a of the electric motor 1 on the housing 7. The annular bearing 11 includes an inner ring 11a mounted on a radially outer side of the rotor 1a, wherein the radially outer side of the rotor 1a faces away from the rotation axis 8. The inner ring 11a of the bearing 11 may be axially located or fixed by a collar or shoulder 1c mounted on or integral with the rotor 1a. Specifically, said collar or shoulder 1c may restrict axial movement of the inner ring 11a of the bearing 11 toward the planetary gear sets 2, 3 and/or toward the differential assembly 4, i. e. toward the right in FIG. 2. The annular bearing 11 includes an outer ring 11b mounted on a radially inner side of a portion of the housing 7, wherein the radially inner side of the portion of the housing 7 faces the rotation axis 8. The outer ring 11b of the bearing 11 may be axially located or fixed by a collar or shoulder 7a mounted on or integral with the housing 7. Specifically, said collar or shoulder 7a may restrict axial movement of the outer ring 11b of the bearing 11 away from the planetary gear sets 2, 3 and/or away from the differential assembly 4, i. e. toward the left in FIG. 2. And the annular bearing 11 includes a plurality of rolling members 11c such as spheres radially disposed and received in between the rings 11a, 11b and in contact with the rings 11a, 11b.

The bearing 12 rotatably supports the first planetary carrier 2b on the rotor 1a. The annular bearing 12 includes an inner ring 12a mounted on a radially outer side of the rotor 1a, wherein the radially outer side of the rotor 1a faces away from the rotation axis 8. A shoulder 1d formed on the radially outer side of the rotor 1a may axially fix or locate the inner ring 12a of the bearing 12. For example, the shoulder 1d may restrict axial movement of the inner ring 12a of the bearing 12 toward the stator 1b and/or away from the differential assembly 4, i. e. toward the left in FIGS. 2 and 3. The annular bearing 12 includes an outer ring 12b mounted on a radially inner side of a portion of the first planetary carrier 2b, wherein the radially inner side of the portion of the first planetary carrier 2b faces the rotation axis 8. A snap ring or circlip 17 mounted on the radially inner side of the first planetary carrier 2b may axially fix or locate the outer ring 12b of the bearing 12. For example, the snap ring or circlip 17 may restrict axial movement of the outer ring 12b of the bearing 12 away from the stator 1b and/or toward the differential assembly 4, i. e. toward the right in FIGS. 2 and 3. And the annular bearing 12 includes a plurality of rolling members 12c such as spheres radially disposed and received in between the rings 12a, 12b and in contact with the rings 12a, 12b.

The bearing 13 rotatably supports the first planetary carrier 2b on the housing 7. The annular bearing 13 includes an inner ring 13a mounted on a radially outer side of the first planetary carrier 2b, wherein the radially outer side of the first planetary carrier 2b faces away from the rotation axis 8. A collar or shoulder 2e mounted on or integral with the first planetary carrier 2b may axially fix or locate the inner ring 13a of the bearing 13. For example, the collar or shoulder 2e may restrict axial movement of the inner ring 13a of the bearing 13 away from the stator 1b and/or toward the differential assembly 4, i. e. toward the right in FIGS. 2 and 3. The annular bearing 13 includes an outer ring 13b mounted on a radially inner side of a portion of the housing 7, wherein the radially inner side of the portion of the housing 7 faces the rotation axis 8. A collar or shoulder 7b mounted on or integral with the housing 7 may axially fix or locate the outer ring 13b of the bearing 13. For example, the collar or shoulder 7b may restrict axial movement of the outer ring 13b of the bearing 13 toward the stator 1b and/or away from the differential assembly 4, i. e. toward the left in FIGS. 2 and 3. And the annular bearing 13 includes a plurality of rolling members 13c such as spheres radially disposed and received in between the rings 13a, 13b and in contact with the rings 13a, 13b. In the embodiment depicted in FIGS. 2 and 3 the bearings 12 and 13 at least partially overlap along the rotation axis 8.

The bearing 14 rotatably supports the second planetary carrier 3b on a portion of the first planetary carrier 2b. The annular bearing 14 includes an inner ring 14a mounted on a radially outer side of the first planetary carrier 2b, wherein the radially outer side of the first planetary carrier 2b faces away from the rotation axis 8. The annular bearing 14 includes an outer ring 14b mounted on a radially inner side of a portion of the second planetary carrier 3b, wherein the radially inner side of the portion of the second planetary carrier 3b faces the rotation axis 8. And the annular bearing 14 includes a plurality of rolling members 14c such as spheres radially disposed and received in between the rings 14a, 14b and in contact with the rings 14a, 14b. A shoulder 2f formed on a radially outer side of the first planetary carrier 2b may axially fix or locate the inner ring 14a of the bearing 14. For example, the shoulder 2f may restrict axial movement of the inner ring 14a of the bearing 14 toward the stator 1b and/or away from the differential assembly 4, i. e. toward the left in FIG. 2. Similarly, a shoulder 3e formed on a radially inner side of the second planetary carrier 3b may axially fix or locate the outer ring 14b of the bearing 14. For example, the shoulder 3e may restrict axial movement of the outer ring 14b of the bearing 14 away from the stator 1b and/or toward the differential assembly 4, i. e. toward the right in FIG. 2.

And the bearing 15 rotatably supports the second planetary carrier 3b and/or the differential carrier 4c of the differential assembly 4, which may be integral with the second planetary carrier, on the housing 7. The annular bearing 15 includes an inner ring 15a mounted on a radially outer side of the differential carrier 4c, wherein the radially outer side of the differential carrier 4c faces away from the rotation axis 8. A shoulder 4e formed on a radially outer side of the differential carrier 4c may axially fix or locate the inner ring 15a of the bearing 15. For example, the shoulder 4e may restrict axial movement of the inner ring 15a of the bearing 15 toward the stator 1b and/or toward the differential assembly 4, i. e. toward the left in FIG. 2. The annular bearing 15 includes an outer ring 15b mounted on a radially inner side of a portion of the housing 7, wherein the radially inner side of the portion of the housing 7 faces the rotation axis 8. A collar 7c mounted on or integral with the housing 7 may axially fix or locate the outer ring 15b of the bearing 15. For example, the collar 7c may restrict axial movement of the outer ring 15b of the bearing 15 away from the stator 1b and/or away from the differential assembly 4, i. e. toward the right in FIG. 2. And the annular bearing 15 includes a plurality of rolling members 15c such as spheres radially disposed and received in between the rings 15a, 15b and in contact with the rings 15a, 15b.

The bearings 11, 12 are axially fixed or held in place by the collar or shoulder 7a mounted on or integral with the housing 7, and by the snap ring or circlip 17 mounted on the first planetary carrier 2b. In this way, the collar or shoulder 7a and the snap ring or circlip 17 further axially fix the rotor 1a of the electric motor 1. Similarly, the bearings 13, 14, 15 axially fix the planetary gear sets 2, 3 and the differential carrier 4c. The bearings 11, 12, 13, 15 may be axially preloaded by spring washers or other spacing elements in order to achieve optimum positioning and/or performance of the electric drive axle 100 during assembly of the electric drive axle 100 and/or when the electric drive axle 100 is in operation.

FIGS. 2-3 are drawn to scale, although other relative dimensions may be used. Further, FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle, comprising:
an electric motor comprising a rotor,
a first planetary gear set comprising a first planetary carrier, the first planetary carrier supported for rotation by a first bearing positioned on a radial face of the rotor of the electric motor and against an axial face of the rotor of the electric motor,
a second planetary gear set comprising a second planetary carrier, the second planetary carrier supported for rotation by a second bearing positioned between a radial face of the first planetary carrier and a radial face of the second planetary carrier, and
a differential assembly,
wherein the electric motor is drivingly connected or drivingly connectable to the differential assembly via the first planetary gear set and the second planetary gear set.

2. The electric drive axle of claim 1, wherein the first planetary gear set, the second planetary gear set and the differential assembly are coaxial with a rotation axis of the rotor of the electric motor.

3. The electric drive axle of claim 1, further comprising a housing, wherein the electric motor comprises a stator which is stationary relative to the housing.

4. The electric drive axle of claim 3, wherein at least one of or all of the electric motor, the first planetary gear set, the second planetary gear set and the differential assembly is/are disposed within the housing.

5. The electric drive axle of claim 3, wherein the housing includes a fluid sump configured to hold a lubricant, and wherein one or more of the electric motor, the first planetary gear set, the second planetary gear set and the differential assembly is/are disposed within the fluid sump.

6. The electric drive axle of claim 3, further including a bearing rotatably supporting the first planetary carrier on the housing.

7. The electric drive axle of claim 1, wherein the first planetary gear set and the second planetary gear set share a common ring gear.

8. The electric drive axle of claim 7, wherein the common ring gear is stationary relative to a stator of the electric motor.

9. The electric drive axle of claim 1, wherein the first planetary gear set comprises a first sun gear and the first planetary carrier with at least one first planet gear rotatably disposed on the first planetary carrier, wherein the second planetary gear set comprises a second sun gear and the second planetary carrier with at least one second planet gear rotatably disposed on the second planetary carrier, and wherein one of the first sun gear and the first planetary carrier is rigidly connected to one of the second sun gear and the second planetary carrier.

10. The electric drive axle of claim 9, wherein the first planetary carrier is rigidly connected to the second sun gear.

11. The electric drive axle of claim 9, wherein the differential assembly comprises a differential carrier, and wherein the second planetary carrier is rigidly connected to or integral with the differential carrier.

12. The electric drive axle of claim 1, wherein the second bearing is positioned against an axial face of the first planetary carrier.

13. The electric drive axle of claim 12, wherein the axial face of the first planetary carrier is formed as a shoulder with the radial face of the first planetary carrier.

14. The electric drive axle of claim 1, wherein the axial face of the rotor of the electric motor is formed as a shoulder with the radial face of the rotor of the electric motor.

15. An electric drive axle, comprising:
an electric motor,
a first planetary gear set,
a second planetary gear set,
a differential assembly, and
a bearing rotatably supporting a first planetary carrier on a rotor of the electric motor, wherein the electric motor is drivingly connected or drivingly connectable to the differential assembly via the first planetary gear set and the second planetary gear set, and wherein the first planetary gear set comprises a first sun gear and the first planetary carrier with at least one first planet gear rotatably disposed on the first planetary carrier, wherein the second planetary gear set comprises a second sun gear and a second planetary carrier with at least one second planet gear rotatably disposed on the second planetary carrier, and wherein one of the first sun gear and the first planetary carrier is rigidly connected to one of the second sun gear and the second planetary carrier.

16. The electric drive axle of claim 15, further including a second bearing positioned between a radial face of the first planetary carrier and a radial face of the second planetary carrier.

17. The electric drive axle of claim 16, wherein an axial face of the first planetary carrier is formed as a shoulder with the radial face of the first planetary carrier.

18. The electric drive axle of claim 17, wherein an axial face of the rotor is formed as a shoulder with a radial face of the rotor.

19. A method, comprising:

operating an electric drive axle, the electric drive axle having an electric motor, a first planetary gear set, a second planetary gear set, and a differential assembly, wherein the electric motor selectively drives the differential assembly via the first planetary gear set and the second planetary gear set, wherein the first planetary gear set comprises a first planetary carrier, the first planetary carrier supported for rotation by a first bearing positioned on a radial face of the rotor and against an axial face of the rotor, and wherein the second planetary gear set comprises a second planetary carrier, the second planetary carrier supported for rotation by a second bearing positioned between a radial face of the first planetary carrier and a radial face of the second planetary carrier.

20. The method of claim 19, further comprising powering a vehicle via the operation of the electric drive axle, wherein the vehicle is a battery electric vehicle without an additional non-electric power source.

* * * * *